United States Patent
Salkintzis et al.

(10) Patent No.: US 12,089,146 B2
(45) Date of Patent: Sep. 10, 2024

(54) DETERMINING A TYPE OF NETWORK CONNECTION FROM AN OS-SPECIFIC CONNECTION CAPABILITY

(71) Applicant: Lenovo (Singapore) PTE. LTD., New Tech Park (SG)

(72) Inventors: Apostolis Salkintzis, Athen (GR); Dimitrios Karampatsis, Ruislip (GB); Roozbeh Atarius, La Jolla, CA (US)

(73) Assignee: Lenovo (Singapore) Pte. Ltd., New Tech Park (SG)

(*) Notice: Subject to any disclaimer, the term of this patent is extended or adjusted under 35 U.S.C. 154(b) by 499 days.

(21) Appl. No.: 16/325,381

(22) PCT Filed: Sep. 28, 2018

(86) PCT No.: PCT/EP2018/076452
§ 371 (c)(1),
(2) Date: Feb. 13, 2019

(87) PCT Pub. No.: WO2020/064125
PCT Pub. Date: Apr. 2, 2020

(65) Prior Publication Data
US 2021/0329541 A1 Oct. 21, 2021

(51) Int. Cl.
*H04W 48/18* (2009.01)
*H04W 76/16* (2018.01)

(52) U.S. Cl.
CPC .......... *H04W 48/18* (2013.01); *H04W 76/16* (2018.02)

(58) Field of Classification Search
CPC .............................. H04W 48/18; H04W 76/16
USPC .......................................................... 370/254
See application file for complete search history.

(56) References Cited

U.S. PATENT DOCUMENTS

| | | | | |
|---|---|---|---|---|
| 9,961,713 | B2* | 5/2018 | Salkintzis | H04W 84/00 |
| 10,602,422 | B1* | 3/2020 | Jagannatha | H04W 40/02 |
| 2017/0245316 | A1* | 8/2017 | Salkintzis | H04W 76/15 |
| 2019/0306752 | A1* | 10/2019 | Lai | H04W 28/0925 |
| 2019/0313358 | A1* | 10/2019 | Lee | H04W 4/70 |

(Continued)

OTHER PUBLICATIONS

3GPP,"3rd Generation Partnership Project; Technical Specification Group Services and System Aspects; Policy and Charging Control Framework for the 5G System; Stage 2 (Release 15)", 3GPP TS 23.503 V15.2.0, Jun. 2018, pp. 1-67.

*Primary Examiner* — Faisal Choudhury
(74) *Attorney, Agent, or Firm* — Kunzler Bean & Adamson

(57) ABSTRACT

Apparatuses, methods, and systems are disclosed for determining what type of network connection to establish from an operating system ("OS") specific connection capability. One apparatus includes a processor and a transceiver that communicates with a mobile communication network over one or more access networks. The processor receives a first request to establish a network connection. Here, the first request includes a first connection capability, the first connection capability being an OS-specific parameter indicating a preferred connection characteristic. The processor selects a routing policy rule based on the first connection capability and sends (via the transceiver) a second request to the mobile communication network to establish a first type of network connection. Here, the first type of network connection is indicated by the selected routing policy rule.

21 Claims, 13 Drawing Sheets

(56) References Cited

U.S. PATENT DOCUMENTS

| | | | |
|---|---|---|---|
| 2019/0356743 A1* | 11/2019 | Park | ................. H04W 76/15 |
| 2020/0053126 A1* | 2/2020 | Nair | ................. H04W 80/12 |
| 2020/0120487 A1* | 4/2020 | Tang | ................. H04W 12/009 |
| 2021/0120596 A1* | 4/2021 | Youn | ................. H04W 76/12 |

* cited by examiner

URSP Rule 250

Precedence: 1
Traffic Descriptor
    Application Identity: com.example.app107
    Connection Capabilities: "internet", "supl"
Route Selection Descriptor-1
    Precedence: 1
    Non-seamless offload indication
Route Selection Descriptor-2
    Precedence: 2
    DNN Selection: "DNN-1"
    Network Slice Selection: "S-NSSAI-a"
    PDU Session Type Selection: "IPv6"
    SSC Mode Selection: "SSC Mode 3"
    Access Type: "3GPP access"

FIG. 2B

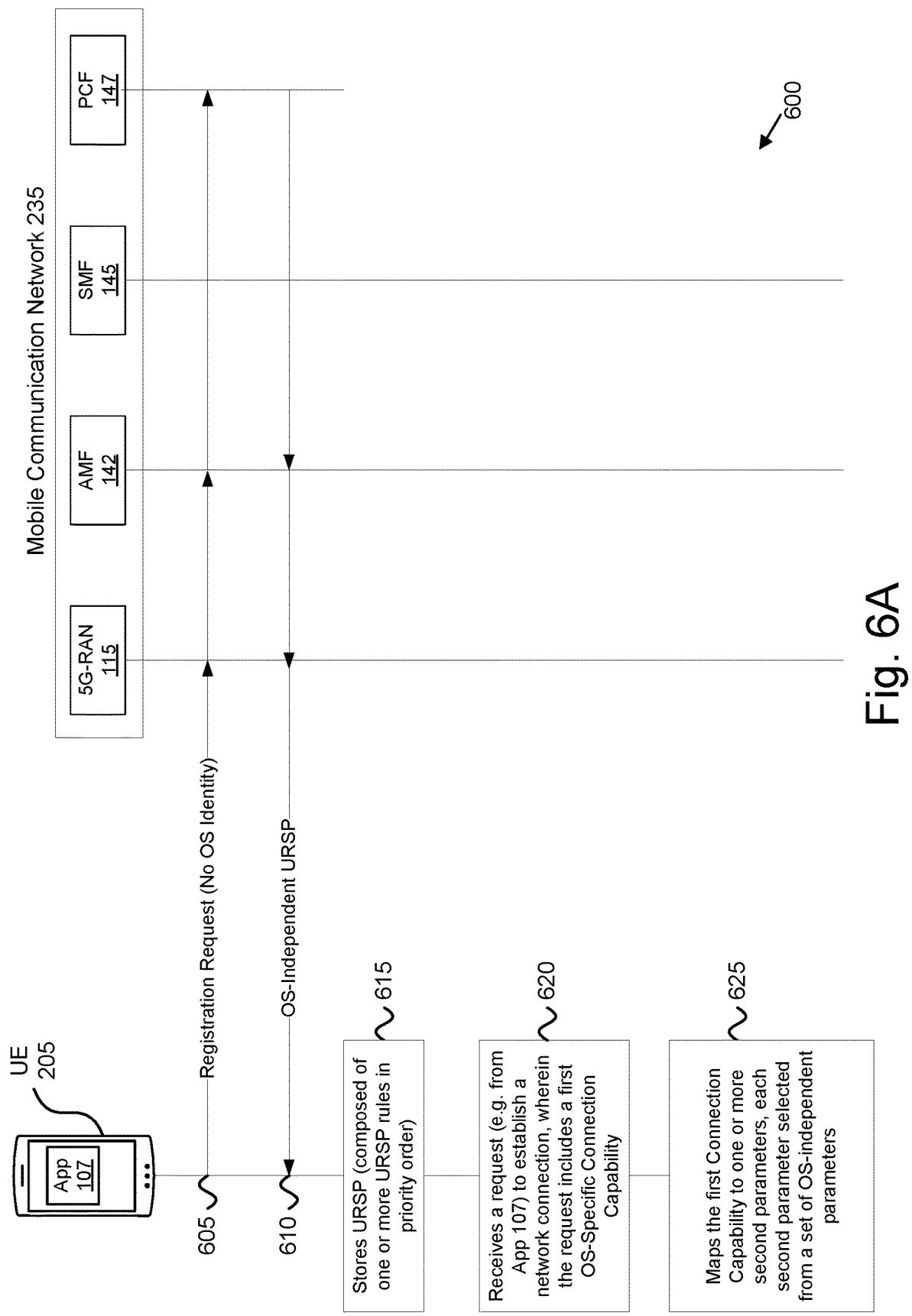

DETERMINING A TYPE OF NETWORK CONNECTION FROM AN OS-SPECIFIC CONNECTION CAPABILITY

FIELD

The subject matter disclosed herein relates generally to wireless communications and more particularly relates to determining what type of network connection to establish from an operating system ("OS") specific connection capability.

BACKGROUND

The following abbreviations and acronyms are herewith defined, at least some of which are referred to within the following description.

Third Generation Partnership Project ("3GPP"), Access and Mobility Management Function ("AMF"), Access Network Performance ("ANP"), Access Point Name ("APN"), Access Stratum ("AS"), Carrier Aggregation ("CA"), Clear Channel Assessment ("CCA"), Control Channel Element ("CCE"), Channel State Information ("CSI"), Common Search Space ("CSS"), Data Network Name ("DNN"), Data Radio Bearer ("DRB"), Downlink Control Information ("DCI"), Downlink ("DL"), Enhanced Clear Channel Assessment ("eCCA"), Enhanced Mobile Broadband ("eMBB"), Evolved Node-B ("eNB"), Evolved Packet Core ("EPC"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Globally Unique Temporary UE Identity ("GUTI"), Hybrid Automatic Repeat Request ("HARQ"), Home Subscriber Server ("HSS"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("PGW"), Public Land Mobile Network ("PLMN"), Quality of Service ("QoS"), Quadrature Phase Shift Keying ("QPSK"), Registration Area ("RA"), Radio Access Network ("RAN"), Radio Access Technology ("RAT"), Radio Resource Control ("RRC"), Receive ("RX"), Switching/Splitting Function ("SSF"), Scheduling Request ("SR"), Secure User Plane Location ("SUPL"), Serving Gateway ("SGW"), Session Management Function ("SMF"), System Information Block ("SIB"), Tracking Area ("TA"), Transport Block ("TB"), Transport Block Size ("TBS"), Time-Division Duplex ("TDD"), Time Division Multiplex ("TDM"), Transmission and Reception Point ("TRP"), Transmit ("TX"), Uplink Control Information ("UCI"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), UE Route Selection Policy ("URSP"), and Worldwide Interoperability for Microwave Access ("WiMAX").

UEs, e.g., mobile devices, may run different operating systems and the UE application requirements are expressed in an operating OS-specific way which cannot be directly mapped to a specific type of mobile data connection (e.g., cannot be directly mapped to a specific set of PDU Session parameters). For example, in a UE running the ANDROID™ mobile OS, an application may request the value 'XYZ' when it wants a connection to access IMS, while, in a UE running the iOS™ mobile OS, an application may request the value 'ABC' when it wants a connection to access IMS.

BRIEF SUMMARY

Methods for determining what type of network connection to establish from an OS-specific connection capability are disclosed. Apparatuses and systems also perform the functions of the methods. One method (e.g., of a UE) for determining what type of network connection to establish from an OS-specific connection capability includes receiving (e.g., by the UE) a first request to establish a network connection, wherein the first request includes a first connection capability, the first connection capability being an OS specific parameter indicating a preferred connection characteristic. The method includes selecting (e.g., by the UE) a routing policy rule based on the first connection capability. The method includes sending (e.g., by the UE) a second request to a mobile communication network to establish a first type of network connection, wherein the first type of network connection is indicated by the selected routing policy rule.

Another method (e.g., of a UE) for determining what type of network connection to establish from an OS-specific connection capability includes receiving (e.g., by the UE) a first request to establish a network connection, wherein the request includes a first parameter, the first parameter being an OS specific value. The method includes deriving a second parameter from the first parameter, the second parameter being an OS-independent value indicating a connection capability of the requested network connection. The method includes selecting (e.g., by the UE) a routing policy rule based on the second parameter. The method also includes sending (e.g., by the UE) second request to a mobile communication network to establish a first type of network connection, wherein the first type of network connection is indicated by the selected routing policy rule.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2B is a diagram illustrating one example of a URSP rule for determining what type of network connection to establish from an OS-specific connection capability

FIG. 6A is a block diagram illustrating one embodiment of a second procedure for determining what type of network connection to establish from an OS-specific connection capability;

DETAILED DESCRIPTION

Figure 1:
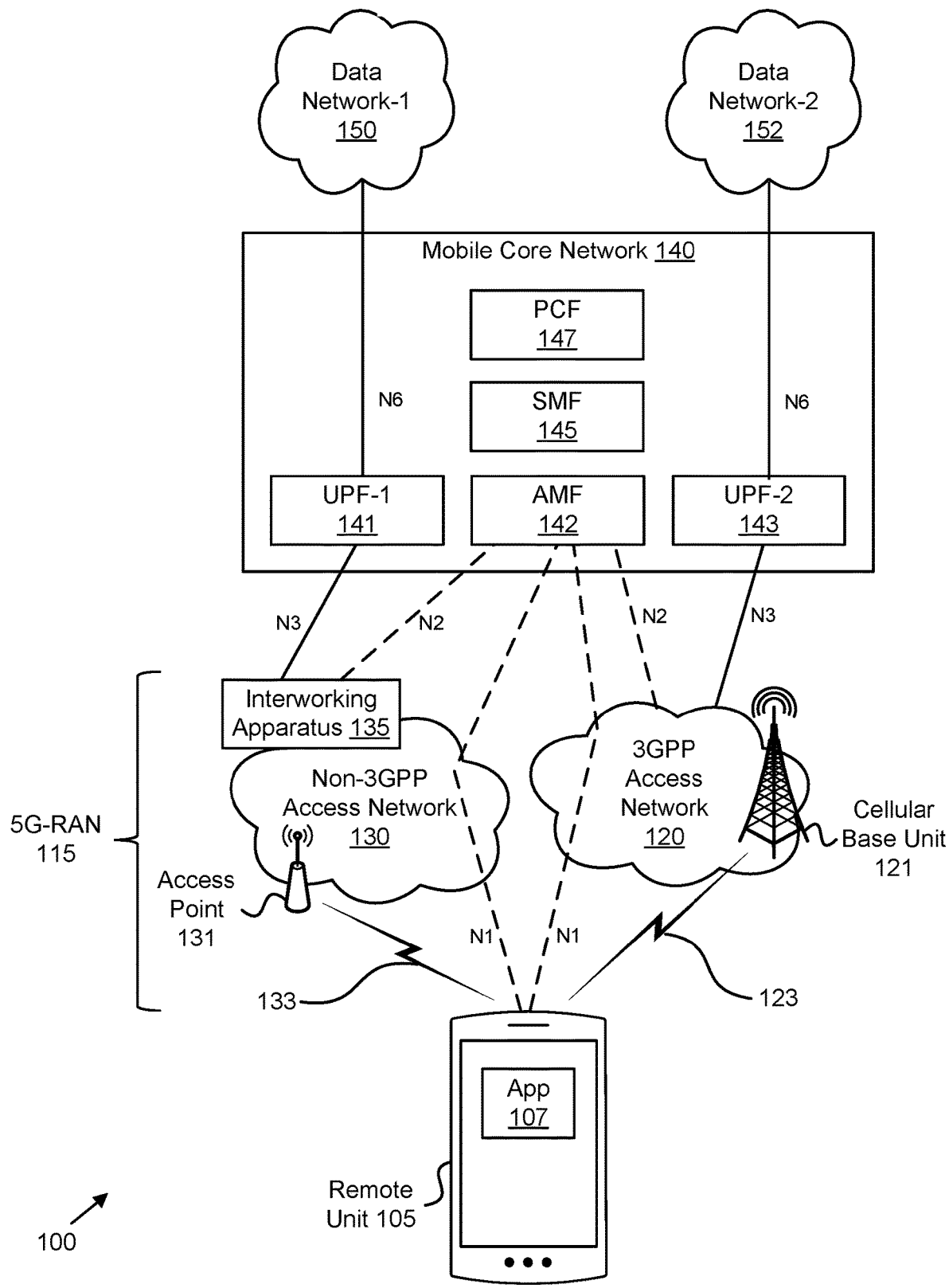
FIG. 1 is a schematic block diagram illustrating one embodiment of a wireless communication system for determining what type of network connection to establish from an OS-specific connection capability.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for enabling a UE to determine what type of mobile data connection to establish (e.g. on which network slice, with what type of IP address, what type of continuity, what type of access, etc.) when an application requests a connection with specific requirements, e.g. to access IMS, or to communicate with Low Latency, or to access the Internet, or to transmit small/infrequent measurements, or to download a new firmware, etc.

As mentioned above, one problem is that the application requirements are expressed in an OS-specific way and, in many cases, they cannot be directly mapped to a specific type of mobile data connection. For example, in an Android UE, an application may request the value XYZ when it wants a connection to access IMS, while, in an iOS UE, an application may request the value ABC when it wants a connection to access IMS. Both UEs, however, should request the same type of mobile data connection (assuming they are using the same PLMN), since both applications request connectivity to IMS. In addition, both UEs should be able to determine the parameters of the requested mobile data connection, such as the DNN, the S-NSSAI (i.e. the network slice), the IP type, the Session & Service Continuity (SSC) mode, etc.

To resolve the above issue, a new parameter, referred to herein as a the "Connection Capability" may be used with routing policy rules to associate OS-specific Application Requirements to an OS-independent (e.g., 3GPP-specific) parameter. In various embodiments, these "Connection Capabilities" may be included in the UE Route Selection Policy ("URSP") that is configured in the UE. In certain embodiments, the UE may map an OS-specific Application Requirements to one or more 3GPP-specific (e.g., OS agnostic) Connection Capabilities, and the corresponding "Connection Capabilities" may be applied to determine the type of a mobile data connection (or, equivalently, the list of connection parameters) that should be requested of the mobile communication network.

FIG. 1 depicts a wireless communication system 100 for determining what type of network connection to establish from an OS-specific connection capability, according to embodiments of the disclosure. In one embodiment, the wireless communication system 100 includes at least one remote unit 105, a 5G-RAN 115, and a mobile core network 140. The 5G-RAN 115 and the mobile core network form a mobile communication network. The 5G-RAN 115 may be composed of a 3GPP access network 120 containing at least one cellular base unit 121 and/or a non-3GPP access network 130 containing at least one access point 131. The remote unit communicates with the 3GPP access network 120 using 3GPP communication links 123 and communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host 155 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 using the 5G-RAN 115 (e.g., a 3GPP access network 120 and/or a non-3GPP access network 130). The mobile core network 140 then relays traffic between the remote unit 105 and either the first data network 150 or the second data network 152 using the PDU session. Note that the remote unit 105 may establish one or more PDU sessions (or other data connections) with the mobile core network 140. As such, the remote unit 105 may have at least one PDU session for communicating with the first data network 150 and at least one PDU session for communicating with the second data network 152.

The cellular base units 121 may be distributed over a geographic region. In certain embodiments, a cellular base unit 121 may also be referred to as an access terminal, a base, a base station, a Node-B, an eNB, a gNB, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121.

The non-3GPP access networks 130 may be distributed over a geographic region. Each non-3GPP access network 130 may serve a number of remote units 105 with a serving area. Typically, a serving area of the non-3GPP access network 130 is smaller than the serving area of a cellular base unit 121. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking function 135. The interworking function 135 provides interworking between the non-3GPP access network 130 and the mobile core network 140, supporting connectivity via the "N2" and "N3" interfaces. As depicted, both the 3GPP access network 120 and the interworking function 135 communicate with the AMF 142 using a "N2" interface. The interworking function 135 communicates with the first UPF 141 using a "N3" interface, while the 3GPP access network 120 communicates with the second UPF 143 using a "N3" interface. In certain embodiments, the interworking function 135 may implement a NAS signaling interface (e.g., using a "N1" interface), which can be used to create a data connection for the remote unit 105 that does not support the 5G NAS protocol over the non-3GPP access network 130 (such a remote unit may be referred to as being "non-5G-capable over non-3GPP").

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP access network 130 deployment that is not controlled by an operator (or trusted partner) of the mobile core network 140, does not have direct access to the mobile core network 140, or does not support the certain security features is referred to as a "non-trusted" non-3GPP access network.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes at least a first UPF ("UPF-1") 141 and a second UPF ("UPF-2") 143. In the depicted embodiment, the first UPF 141 serves the non-3GPP access network 130 and the second UPF 143 serves the 3GPP access network 120. In other embodiments, the UPF 141 (or UPF 143) may serve both the 3GPP access network 120 and the non-3GPP access network 130.

The mobile core network 140 also includes multiple control plane functions including, but not limited to, an Access and Mobility Management Function ("AMF") 142 that serves both the 3GPP access network 120 and the non-3GPP access network 130, a Session Management Function ("SMF") 145, and a Policy Control Function ("PCF") 147. In certain embodiments, the mobile core network 140 may also include an Authentication Server Function ("AUSF"), a Unified Data Management function ("UDM"), a Network Repository Function ("NRF") 146 (used by the various NFs to discover and communicate with each other over APIs), or other NFs defined for the 5GC. Although specific numbers and types of network functions are depicted in FIG. 1, one of skill in the art will recognize that any number and type of network functions may be included in the mobile core network 140.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g. NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

The mobile core network 140 can support different types of mobile data connections and different types of network slices, wherein each mobile data connection utilizes a specific network slice. The different network slices are not shown in FIG. 1 for ease of illustration, but their support is assumed.

As described in greater detail below, the remote unit 105 is able to determine and request a specific type of mobile data connection (out of all possible types of mobile data connections supported by the mobile communication network) that is suitable to fulfill the requirements expressed by the application 107 that wants network connectivity.

Figure 2A:
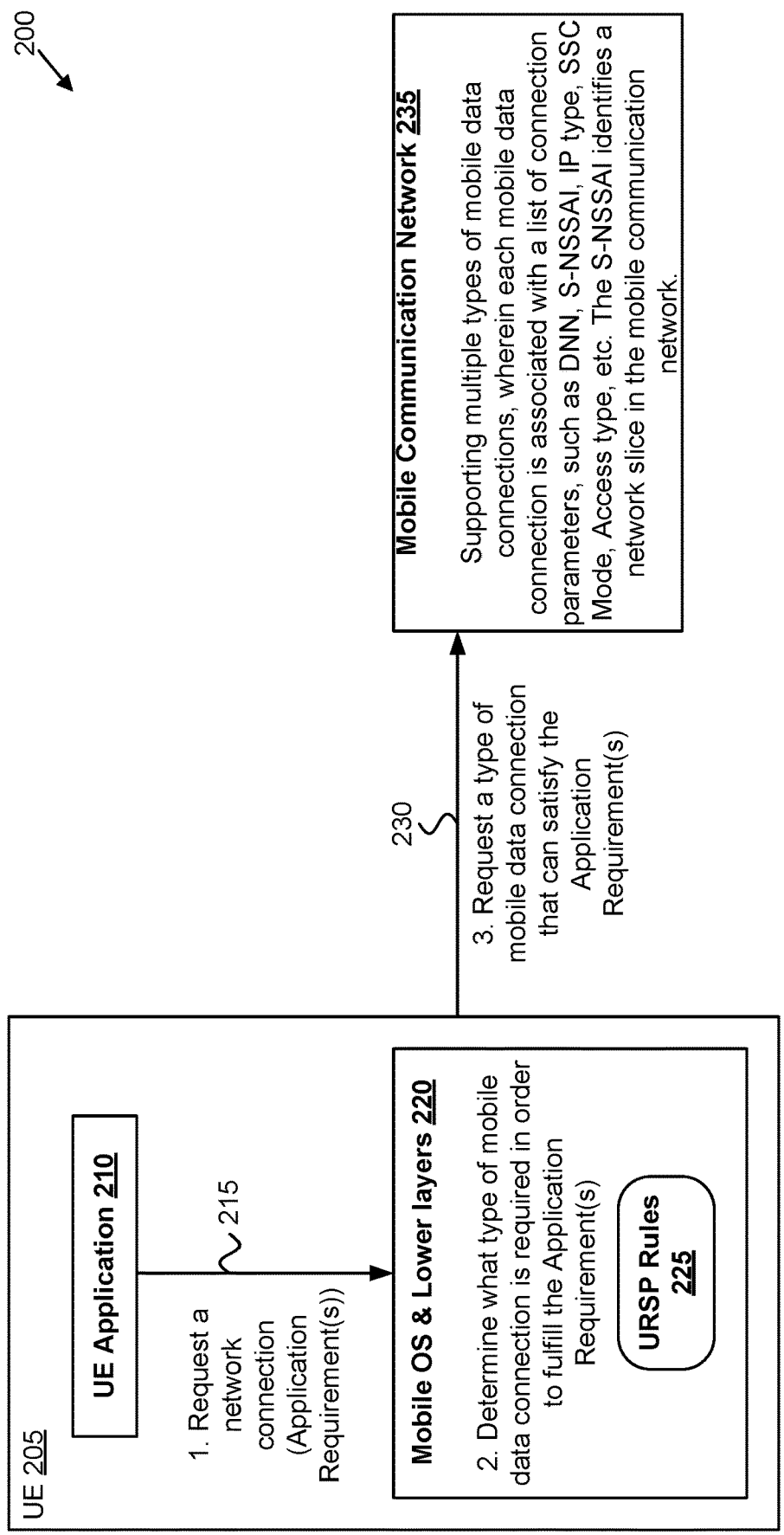
FIG. 2A is a block diagram illustrating one embodiment of a network architecture for determining what type of network connection to establish from an OS-specific connection capability.

FIG. 2A depicts a network architecture 200 for determining what type of network connection to establish from an OS-specific connection capability, according to embodiments of the disclosure. The network architecture 200 includes a UE 205 and a mobile communication network 235. The network architecture 200 may be a simplified embodiment of the wireless communication system 100, wherein the UE 205 is an embodiment of the remote unit 105 and the mobile communication network 235 is an embodiment of the 5G-RAN 115 and mobile core network 140. The mobile communication network 235 supports multiple types of mobile data connections. Each mobile data connection is associated with a list of connection parameters, such as DNN, S-NSSAI, IP type, SSC Mode, Access type, etc. Note that the S-NSSAI identifies a network slice in the mobile communication network. The UE 205 implements a procedure for determining the type of mobile data connection to establish.

The UE 205 includes a UE application 210 and Mobile OS and lower layers (collectively indicated by block 220). In various embodiments, the UE application 210 makes a request 215 for a network connection and includes one or more Application Requirements in the request 215. These Application Requirements are OS-specific, such that different values will be used in different operating systems ("OSes"). The Mobile OS and/or the lower layers then uses the URSP rules 225 to determine the type of mobile data connection is required in order to meet the Application Requirement(s).

In one embodiment, the URSP rules 225 are OS-specific. For example, the UE 205 may provide the mobile communication network 235 an OS Identity parameter and the mobile communication network 235 then provides the UE 205 with OS-specific URSP rules 225. In such embodiments, the Mobile OS and/or the lower layers use the Application Requirement(s) with the OS-specific URSP rules 225 to determine the type of mobile data connection is required in order to meet the Application Requirement(s). Here, the UE examines the configured URSP rules 225 to find a rule that matches the Application Requirement(s). If such a URSP rule 225 is found, then the UE 205 applies the rule to determine how to route the applications traffic and whether it is required to establish a new mobile data connection (or PDU Session). The matched URSP rule 225 may include the connectivity parameters (e.g. DNN, S-NSSAI, SSC Mode, etc.) that should be used for establishing a PDU Session that satisfies the Application Requirement(s).

In other embodiments, the URSP rules 225 are non-OS-specific. In such embodiments, the Mobile OS and/or the lower layers map the OS-specific Application Requirement(s) to one or more OS-independent parameters. The OS-independent parameter(s) are then used with the OS-independent URSP rules 225 to determine the type of mobile data connection that is required in order to meet the Application Requirement(s) (e.g., determine the connectivity parameters for a suitable PDU Session). As used herein, a URSP containing OS-independent connection capabilities may be referred to as "OS-independent" URSP and the non-OS-specific URSP rules may be referred to as "OS-independent" rules.

After the UE 205 maps the Application Requirement(s) to one or more Connection Capabilities, it then examines the configured URSP rules 225 to find a rule that matches these Connection Capabilities. If such a URSP rule 225 is found, then the UE applies the rule to determine how to route the applications traffic and whether it is required to establish a new mobile data connection (or PDU Session). The matched URSP rule 225 may include the connectivity parameters (e.g. DNN, S-NSSAI, SSC Mode, etc.) that should be used for establishing a PDU Session that satisfies the Application Requirement(s).

Note that each URSP rule 225 has a Precedence value (indicating priority), a Traffic Descriptor component (describing the traffic that matches the rule), and one or more Route Selection Descriptors. Each Route Selection Descriptor describes how the matched traffic should be routed by the UE 205. Typically, a Route Selection Descriptor indicates that the matched traffic (a) should be offloaded to a non-3GPP access network, e.g., without traversing the mobile core network, or (b) should be routed over a PDU Session that applies specific PDU Session parameters.

An example URSP rule 250 is shown in FIG. 2B. The depicted URSP rule 205 enforces the following policy:

When the application "com.example.app107" requests a network connection with Application Requirements that can be mapped to (or associated with) the Connection Capabilities "internet" or "supl", then the UE 205 is to first attempt to directly offload the traffic of this application to a non-3GPP access, outside of a PDU session (according to Route Selection Descriptor-1).

If direct offload is not possible, e.g., because the UE 205 is not connected to a non-3GPP access, then the UE 205 is to determine if it has an established a PDU session over 3GPP access with parameters: DNN-1, S-NSSAI-a, IPv6 and SSC Mode 3 (according to Route Selection Descriptor-2). If the UE 205 has an established PDU session with these parameters, then all the application's traffic is to be routed via this PDU session. If the UE 205 does not have an established PDU session with these parameters, then the UE 205 is to first establish such a PDU session and then route all application's traffic via this PDU session.

After determining the type of mobile data connection is required in order to meet the Application Requirement(s), the Mobile OS and/or the lower layers send a request 230 to the mobile communication network 235 for a first type of mobile data connection that fulfills the Application Requirement(s).

Figure 3:
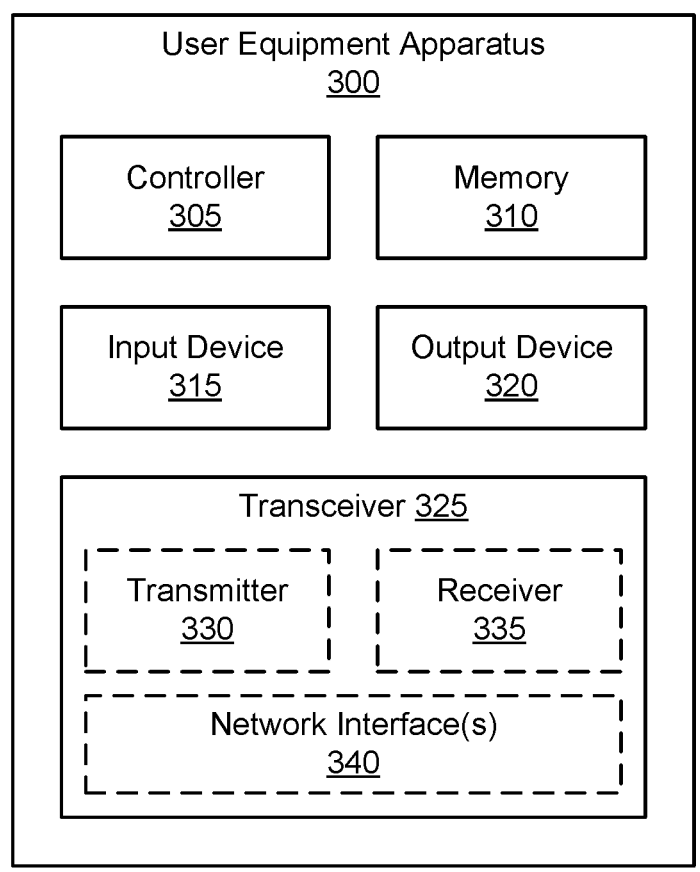
FIG. 3 is a schematic block diagram illustrating one embodiment of a user equipment apparatus for determining what type of network connection to establish from an OS-specific connection capability.

FIG. 3 depicts one embodiment of a user equipment apparatus 300 that may be used for determining what type of network connection to establish from an OS-specific connection capability, according to embodiments of the disclosure. The user equipment apparatus 300 may be one embodiment of the remote unit 105. Furthermore, the user equipment apparatus 300 may include a processor 305, a memory 310, an input device 315, an output device 320, a transceiver 325. In some embodiments, the input device 315 and the output device 320 are combined into a single device, such as a touch screen. In certain embodiments, the user equipment apparatus 300 does not include any input device 315 and/or output device 320.

As depicted, the transceiver 325 includes at least one transmitter 330 and at least one receiver 335. Additionally, the transceiver 325 may support at least one network interface 340. Here, the at least one network interface 340 facilitates communication with an eNB or gNB (e.g., using the "Uu" interface). Additionally, the at least one network interface 340 may include an interface used for communications with an UPF, an SMF, and/or a P-CSCF.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, the first transceiver 325, and the second transceiver 330.

In various embodiments, the processor 305 receives (e.g., from an internal application) a first request to establish a network connection. Here, the first request includes a first connection capability (e.g., a first parameter), the first connection capability being an OS-specific parameter indicating a preferred connection characteristic. The processor 305 selects a routing policy rule based on the first connection capability and controls the transceiver 325 to send a second request to the mobile communication network to establish a first type of network connection. Here, the first type of network connection is indicated by the selected routing policy rule.

In some embodiments, the selected routing policy rule indicates PDU Session parameters to be used to establish a PDU Session supporting the first connection capability. In such embodiments, sending the second request to establish the first type of network connection includes sending a PDU Session Establishment request that contains the PDU Session parameters. Note here that the first type of network connection is defined by the PDU Session parameters.

In various embodiments, the first request is received from an application running on the user equipment apparatus 300 (e.g., executed by the processor 305). Said application may be an embodiment of the application 107 and/or the UE application 210. In some embodiments, the first connection capability indicates application requirements for the network connection. In certain embodiments, the application requirements are preferences that do not override the PDU Session parameters indicated in the URSP.

In a first implementation, the processor 305 sends, via the transceiver 325, an OS Identity parameter to the mobile communication network. In one embodiment, the OS Identity parameter is sent in a Registration Request message, without a request from the mobile communication network. In another embodiment, sending the OS Identity parameter to the mobile communication network occurs in response to the mobile communication network requesting OS information.

Moreover, in the first implementation the processor 305 receives a prioritized set of routing policy rules, wherein a routing policy includes one or more OS-specific connection capabilities. Here, the first connection capability reported by the application is included in the plurality of OS-specific connection capabilities contained in the routing policy rules. In some embodiments, the prioritized set of routing policy comprises an OS-specific URSP. In certain embodiments, the prioritized set of routing policy rules comprises a plurality of OS-specific application identities. In various embodiments, the first connection capability indicates one or more of: access to a specific data network, access to a specific service provided by the mobile communication network, connectivity via a specific network slice in the mobile communication network, connectivity via a specific type of access network, low-latency connection, and infrequent data connection.

In a second implementation, the processor 305 selects the routing policy rule by identifying one or more second parameters corresponding to the first connection capability, each second parameter being an OS-independent parameter corresponding to the first connection capability. In such embodiments, the processor 305 selects the routing policy by searching a prioritized set of routing policy rules for a highest priority rule matching the one or more second parameters. In the second implementation, the prioritized set of routing policy rules may be an URSP provisioned by the mobile communication network (e.g., an "OS-independent URSP with URSP rules containing OS-independent connection capabilities). Here, various routing policy rules in the URSP include the one or more OS-independent second parameters.

In certain embodiments, identifying the one or more second parameters corresponding to the first connection capability includes the processor 305 deriving (e.g., mapping or translating) the first connection capability to an OS-independent parameter selected from a predetermined set of parameters. In such embodiments, the one or more second parameters may indicate one or more of: access to a specific data network, access to a specific service provided by the mobile communication network, connectivity via a specific network slice in the mobile communication network, low-latency connection, and infrequent data connection. In certain embodiments, each second parameter indicates a type of access network to be used to establish the network connection.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to determining what type of network connection to establish from an OS-specific connection capability, for example storing URSP rules, OS identities, application identifiers, and the like. In certain embodiments, the memory 310 also stores program code and related data, such as an operating system ("OS") or other controller algorithms operating on the user equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, all or portions of the output device 320 may be located near the input device 315.

As discussed above, the transceiver 325 communicates with one or more network functions of a mobile communication network via one or more access networks. The transceiver 325 operates under the control of the processor 305 to transmit messages, data, and other signals and also to receive messages, data, and other signals. For example, the processor 305 may selectively activate the transceiver (or portions thereof) at particular times in order to send and receive messages. The transceiver 325 may include one or more transmitters 330 and one or more receivers 335. In certain embodiments, the one or more transmitters 330 and/or the one or more receivers 335 may share transceiver hardware and/or circuitry. For example, the one or more transmitters 330 and/or the one or more receivers 335 may share antenna(s), antenna tuner(s), amplifier(s), filter(s), oscillator(s), mixer(s), modulator/demodulator(s), power supply, and the like.

In various embodiments, the transceiver 325 is configured to communication with 3GPP access network(s) 120 and the non-3GPP access network(s) 130. In some embodiments, the transceiver 325 implements modem functionality for the 3GPP access network(s) 120 and/or the non-3GPP access network(s) 130. In one embodiment, the transceiver 325 implements multiple logical transceivers using different communication protocols or protocol stacks, while using common physical hardware.

Figure 4:
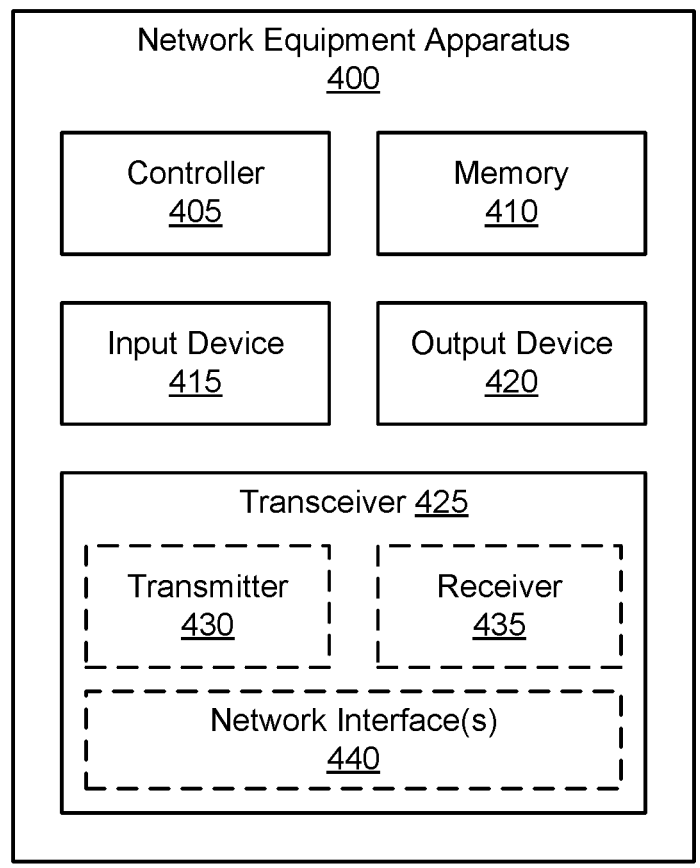
FIG. 4 is a schematic block diagram illustrating one embodiment of a network equipment apparatus for determining what type of network connection to establish from an OS-specific connection capability.

FIG. 4 depicts one embodiment of a network equipment apparatus 400 that may be used for determining what type of network connection to establish from an OS-specific connection capability, according to embodiments of the disclosure. In some embodiments, the networking apparatus 400 may be one embodiment of the cellular base unit 121, the access point 131, the 5G-RAN node 115, the AMF 142, the SMF 145, and/or the like. Furthermore, the network equipment apparatus 400 may include a processor 405, a memory 410, an input device 415, an output device 420, and a transceiver 425. In some embodiments, the input device 415 and the output device 420 are combined into a single device, such as a touchscreen. In certain embodiments, the network equipment apparatus 400 may not include any input device 415 and/or output device 420.

As depicted, the transceiver 425 includes at least one transmitter 430 and at least one receiver 435. Additionally, the transceiver 425 may support at least one network interface 440, such as an "N3" interface used for communications between a user plane function (e.g., the UPF 141 and/or UPF 245) and an access network node (e.g., the base unit 110, interworking function 135, the TWAP 215, the TWIF 220, the WLAN AP 265, the N3IWF 270, the 4G-RG 285, the W-5GAN 290 and/or (R)AN node), an "N4" interface used for communications between a session management function (e.g., the SMF 145) and a UPF, an "N6" interface used for communications between a UPF and an application function, and the like.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the processor 405 receives (e.g., from a UE) a request to establish a first type of network connection. In various embodiments, the request is a PDU Session Establishment request containing a set of PDU Session parameters, the first type of network connection being indicated by the PDU Session parameters. In response, the processor 405 may establish the requested network connection (e.g., establish the requested PDU Session).

In some embodiments, the processor 405 receives an OS Identity parameter from the UE. In one embodiment, the OS Identity parameter is unsolicited (e.g., received not in response to a request made to the UE). For example, the OS Identity parameter may be included in a Registration Request received from the UE. In another embodiment, the network processor 405 sends a request for OS information to the UE, wherein the OS Identity parameter is received in response to the OS information request message.

In response to receiving the OS Identity parameter, the processor 405 selects a prioritized set of routing policy rules (e.g., an OS-specific URSP) based on the OS Identity parameter and sends the selected set of routing policy rules to the UE, wherein a routing policy rule includes one or more OS-specific connection capabilities. In certain embodiments, the prioritized set of routing policy rules also includes a plurality of OS-specific application identities. In various embodiments, the OS-specific connection capability indicates one or more of: access to a specific data network, access to a specific service provided by the mobile communication network, connectivity via a specific network slice in the mobile communication network, connectivity via a specific type of access network, low-latency connection, and infrequent data connection.

In other embodiments, the processor 405 does not have OS information for the UE and sends to the UE a set of routing policy rules containing OS-independent connection capabilities (e.g., sends an OS-independent URSP). Here, an OS-independent routing policy rule may include one or more OS-independent connection capabilities. Said connection capabilities may indicate: access to a specific data network, access to a specific service provided by the mobile communication network, connectivity via a specific network slice in the mobile communication network, low-latency connection, and/or infrequent data connection. In certain embodiments, each OS-independent connection capability indicates a type of access network to be used to establish the network connection.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to determining what type of network connection to establish from an OS-specific connection capability, for example storing NAI, PDU Session IDs, SM Contexts, and the like. In certain embodiments, the memory 410 also stores program code and related data, such as an operating system ("OS") or other controller algorithms operating on the network equipment apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user. As another, non-limiting example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

The transceiver 425 communicates with one or more access network nodes and/or with one or more network functions of a mobile communication network. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435. As discussed above, the transceiver 425 may support one or more the network interface 440 for communicating with network functions in a mobile core network.

Figure 5A:
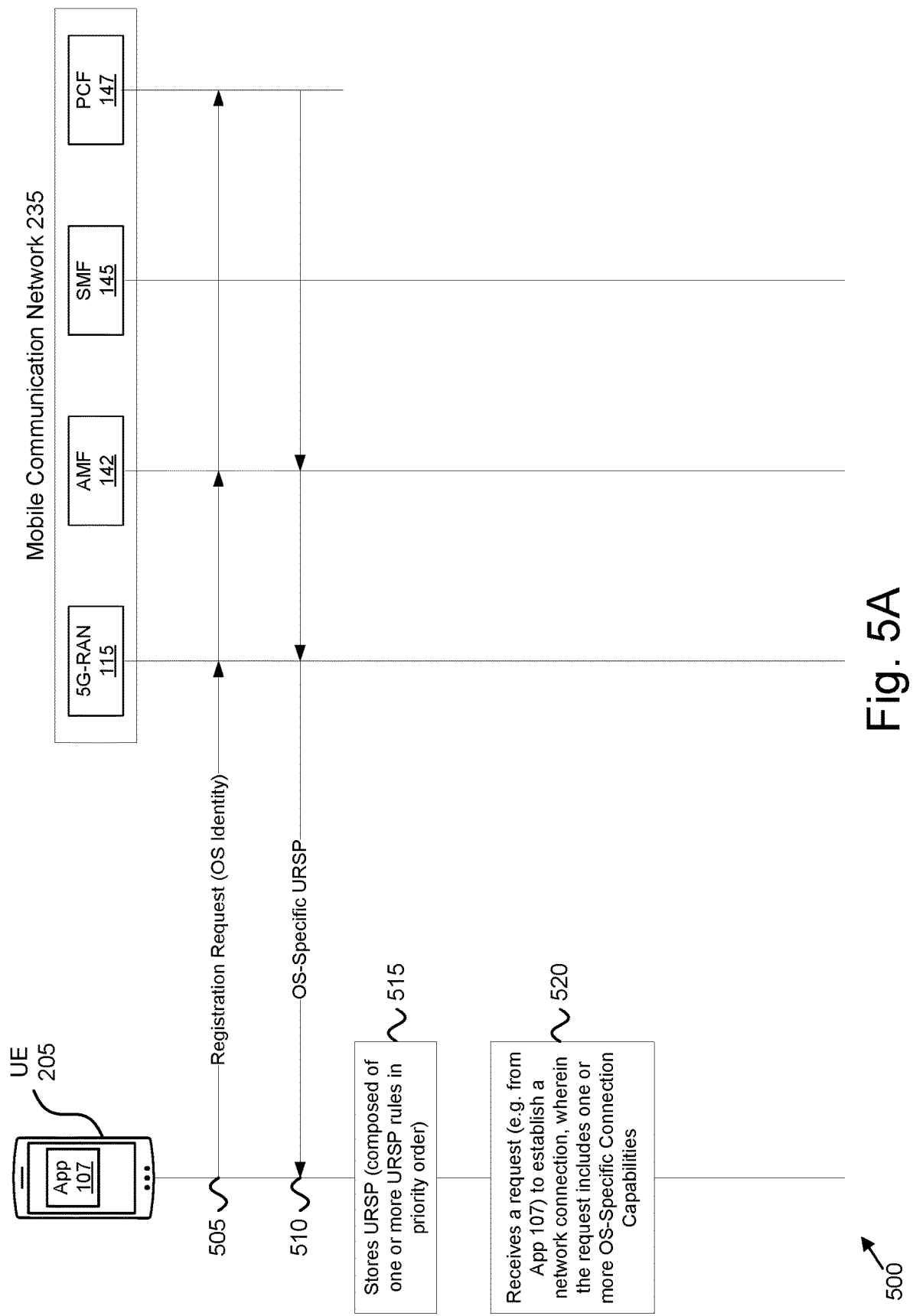
FIG. 5A is a block diagram illustrating one embodiment of a first procedure for determining what type of network connection to establish from an OS-specific connection capability.
Figure 5B:
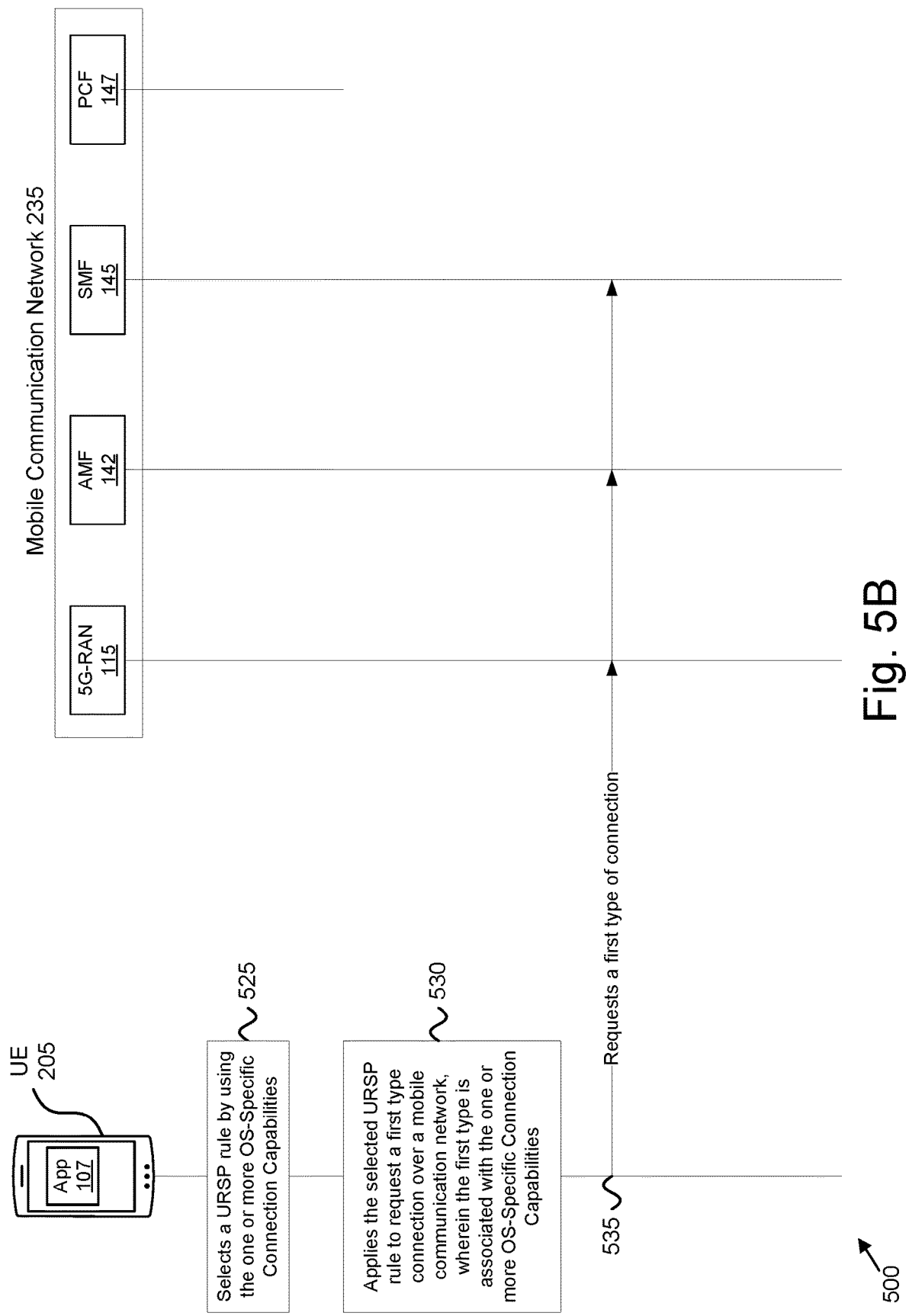
FIG. 5B is a block diagram is a continuation of the procedure of FIG. 6A.

FIGS. 5A-5B depict a first network procedure 500 for determining what type of network connection to establish from an OS-specific connection capability, according to embodiments of the disclosure. The first network procedure 500 involves the UE 205 and the mobile communication network 235. Here, the mobile communication network 235 includes at least a 5G-RAN 115, an AMF 142, a SMF 145, and a PCF 147.

Referring to FIG. 5A, the first network procedure 500 begins and the UE 205 sends a Registration Request to the mobile communication network 235, e.g., to the AMF 142 via the 5G-RAN 115 (see messaging 505). Here, the Registration Request includes an OS Identity parameter. The OS Identity parameter indicates the type of operating system running on the UE 205. In certain embodiments, the OS Identity parameter indicates a version number of the OS. The AMF 142 forwards the OS Identity parameter to the PCF 147.

Using the OS Identity parameter, the mobile communication network 235 provisions the UE 205 with an OS-specific URSP (see messaging 510). In certain embodiments, the PCF 147 selects a URSP based on the OS Identity parameter. The UE 205 then stores the URSP (see block 515). Note the URSP includes a prioritized set of one or more URSP rules.

At some point in time, the UE 205 receives a request (internally from the application 107) to establish a network connection (e.g., a PDU session, see block 520). Here, the request includes one or more OS-specific connection capabilities. The OS-specific connection capability indicates the application requirements for the requested network connection (e.g., the application 107 requires a connection for IMS access). In various embodiments, the OS-specific connection capability is from a pre-defined set and describes in a specific way (e.g., using OS-specific values) a capability that can be provided by a mobile data connection (e.g. capability to provide low_latency, capability to access IMS, capability to support infrequent_small_data communication, etc.).

The contents of the first Connection Capability depend on the OS of the UE 205. For example, an application running within an ANDROID™ OS may include in the Application Requirements the parameter 'NET_CAPABILITY_SUPL' to indicate that it wants a connection for accessing the operator's SUPL servers over type of access network. As another example, the application running within an ANDROID™ OS may include in the Application Requirements the parameters 'NET_CAPABILITY_INTERNET' and 'TRANSPORT_WIFI' to indicate that it wants an Internet connection over a WLAN.

The UE 205 derives a second parameter (e.g., OS-independent Connection Capability) from the first parameter (e.g., application requirement or OS-specific Connection Capability), where the second parameter may contain one or more 3GPP-defined values, which are independent of any OS. Examples of the second parameter include, but are not limited to: "internet", "internet_non3GPP", "mms", "mms_non3GPP", "low latency", "low latency_non3GPP", "infrequent small data", "infrequent small data_non3GPP", "ims", "ims_non3GPP", "supl", "supl_non3GPP", and the like.

Continuing at FIG. 5B, the UE 205 selects the URSP rule based on the one or more OS-specific Connection Capabilities (see block 525). The selected URSP rule matches the one or more OS-specific Connection Capabilities and indicates the PDU Session parameters that should be used to establish a PDU Session supporting these Connection Capabilities. For example, the URSP rule may contain: "Connection Capability=ims; PDU Session parameters=DNN-1, S-NSSAI-a, SSC Mode 3, IPv6, 3GPP access."

The UE 205 then applies the selected URSP rule to request a first type of connection over a mobile communication network, wherein the first type is associated with the one or more OS-Independent Connection Capabilities (see block 530) and send a request to establish the first type of connection (see messaging 535). Depending on the selected URSP rule, the request may be sent over the first type of access 120, or over the second type of access 130, and utilizes a certain network slice (e.g., corresponding to the S-NSSAI).

Figure 6B:
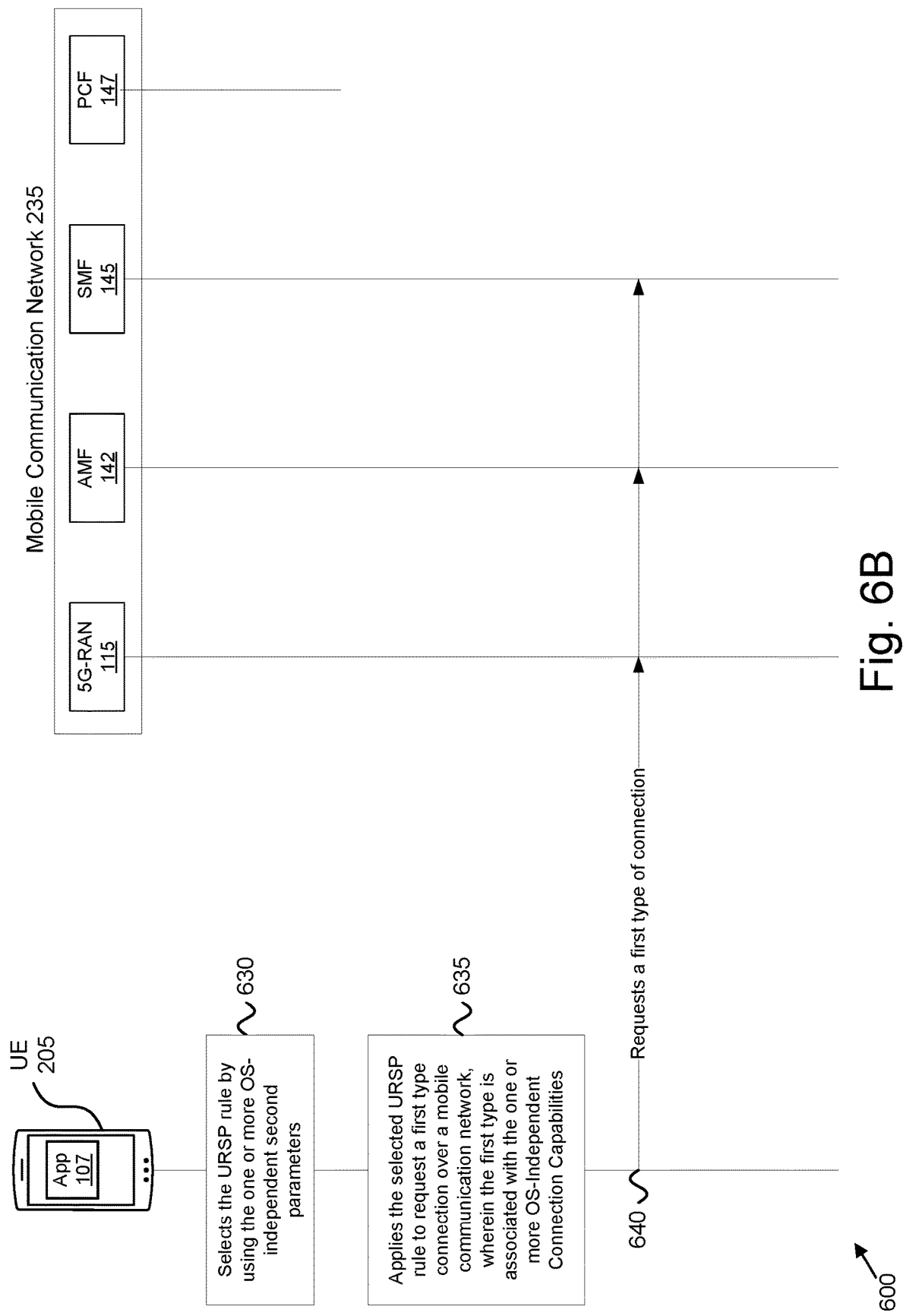
FIG. 6B is a block diagram is a continuation of the procedure of FIG. 6A.

FIGS. 6A-6B depict a second network procedure 600 for determining what type of network connection to establish from an OS-specific connection capability, according to embodiments of the disclosure. The second network procedure 600 involves the UE 205 and the mobile communication network 235. Here, the mobile communication network 235 includes at least a 5G-RAN 115, an AMF 142, a SMF 145, and a PCF 147.

Referring to FIG. 6A, the second network procedure 600 begins and the UE 205 sends a Registration Request to the mobile communication network 235, e.g., to the AMF 142 via the NG-RAN 115 (see messaging 605). Here, the Registration Request does not an OS Identity parameter. Moreover, the mobile communication network 235 does not request OS information from the UE 205, such that the mobile communication network 235 is unaware of the type or version of OS running on the UE 205.

Accordingly, the mobile communication network 235 provisions the UE 205 with a generic, OS-independent URSP (see messaging 610). In certain embodiments, the PCF 147 sends the URSP to the UE 205. The UE 205 then stores the URSP (see block 615). Note the URSP includes a prioritized set of one or more URSP rules. Here, the URSP rules may contain one or more OS-independent connection capabilities. While depicted as a response to the Registration Request, in other embodiments the URSP may be provided and/or updated by the mobile communication network 235 to the UE 205 at any suitable time instance.

At some point in time, the UE 205 receives a request (internally from the application 107) to establish a network connection (e.g., a PDU session, see block 620). Here, the request includes a first parameter indicating an OS-specific connection capability (e.g., an OS-specific Application Requirement). The OS-Specific connection capability indicates, in OS-specific format, the application requirement(s) for the requested network connection (e.g., the application 107 requires a connection for IMS access).

The UE 205 maps the first parameter to one or more second parameters (e.g., one or more OS-independent connection capabilities), each second parameter selected from a set of OS-independent parameters (see block 625). Note that each second parameter in the pre-defined set describes in a generic way (e.g., using OS-independent values) a capability that can be provided by a mobile data connection (e.g. capability to provide low_latency, capability to access IMS, capability to support infrequent_small_data communication, etc.).

The contents of the first parameter (e.g., OS-specific Application Requirement(s) or Connection Capability) depend on the OS of the UE 205. For example, an application running within an ANDROID™ OS may include in the Application Requirements the parameter 'NET_CAPABILITY_SUPL' to indicate that it wants a connection for accessing the operator's SUPL servers over type of access network. As another example, the application running within an ANDROID™ OS may include in the Application Requirements the parameters 'NET_CAPABILITY_INTERNET' and 'TRANSPORT_WIFI' to indicate that it wants an Internet connection over a WLAN.

The UE 205 derives a second parameter (e.g., OS-independent Connection Capability) from the first parameter (e.g., application requirement or OS-specific Connection Capability), where the second parameter may contain one or more 3GPP-defined values, which are independent of any OS. Examples of the second parameter include, but are not limited to: "internet", "internet_non3GPP", "mms", "mms_non3GPP", "low latency", "low latency_non3GPP", "infrequent small data", "infrequent small data_non3GPP", "ims", "ims_non3GPP", "supl", "supl_non3GPP", and the like.

In one embodiment, the UE 205 maps the Application Requirements (e.g., first parameter) to the "internet" Connection Capability (e.g., second parameter) in response to the UE 205 determining that the application 107 requests a connection to the Internet without specifying a preferred access type. In another embodiment, the UE 205 maps the Application Requirements (e.g., first parameter) to the "internet non3GPP" Connection Capability (e.g., second parameter) in response to determining that the application 107 requests a connection to the Internet over Wi-Fi or another non-3GPP access network. Mapping to other Connection Capabilities is carried out similarly. For example, the UE 205 maps the Application Requirements to the "low latency" Connection Capability when the UE 205 determines that the application 107 requests a connection that can provide low latency over any type of access network.

By applying this kind of mapping from OS-dependent values to OS-independent, well-known values defined by 3GPP, the operator of the mobile communication network 235 is able to easily configure the URSP rules without worrying of what Application Requirements are provided by the application.

Continuing at FIG. 6B, the UE 205 selects the URSP rule by using the one or more OS-independent second parameters (see block 630). The selected URSP rule matches the one or more OS-Independent Connection Capabilities and indicates the PDU Session parameters that should be used to establish a PDU Session supporting these Connection Capabilities. For example, the URSP rule may contain: "Connection Capability=ims; PDU Session parameters=DNN-1, S-NSSAI-a, SSC Mode 3, IPv6, 3GPP access."

The UE 205 then applies the selected URSP rule to request a first type of connection over a mobile communication network, wherein the first type is associated with the one or more OS-Independent Connection Capabilities (see block 635) and send a request to establish the first type of connection (see messaging 640). Depending on the selected URSP rule, the request may be sent over the first type of access 120, or over the second type of access 130, and utilizes a certain network slice (e.g., corresponding to the S-NSSAI).

Figure 7A:
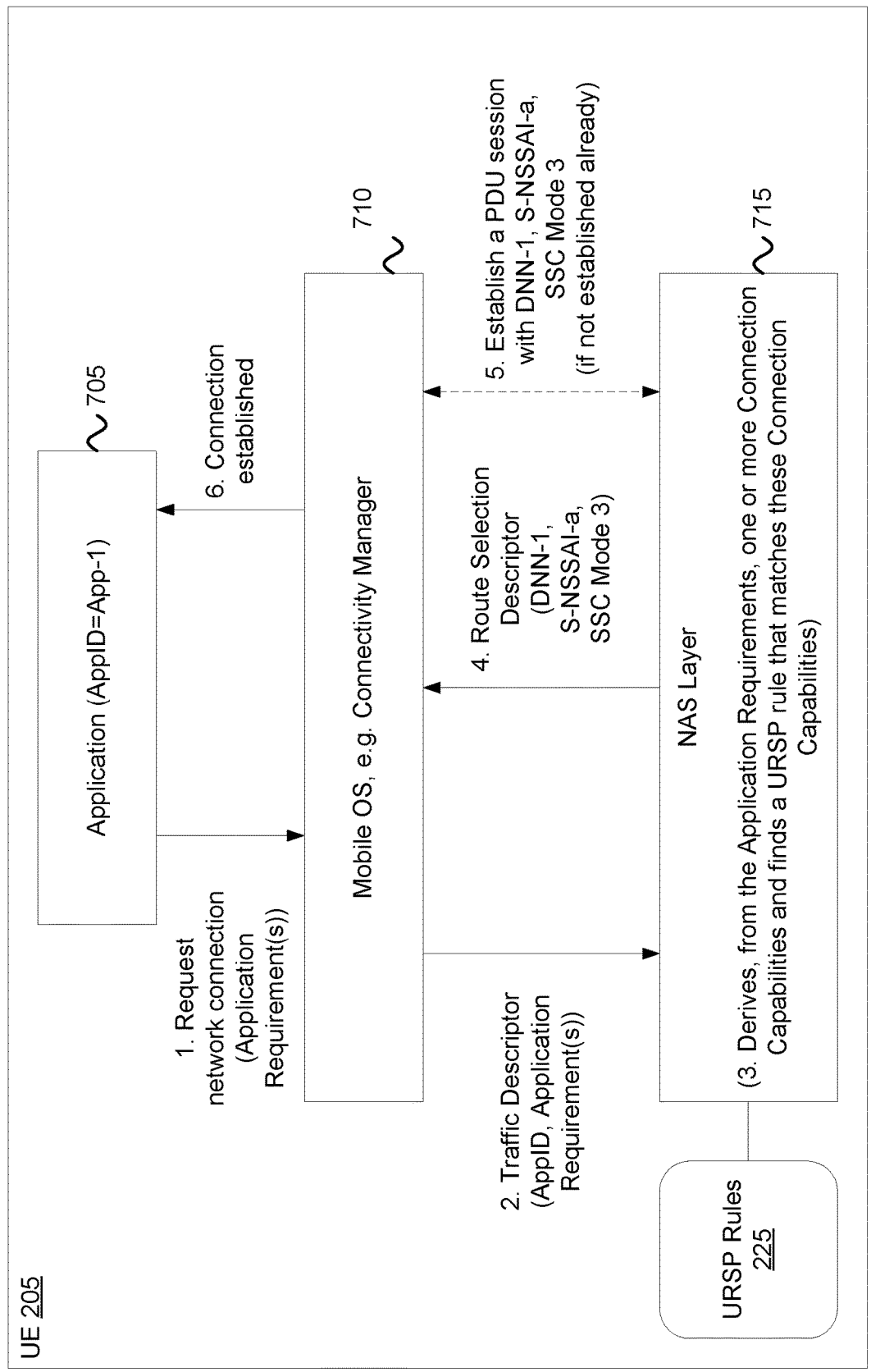
FIG. 7A is a block diagram illustrating one embodiment of a UE for mapping an OS-specific application requirement to an OS-independent connection capability.
Figure 7B:
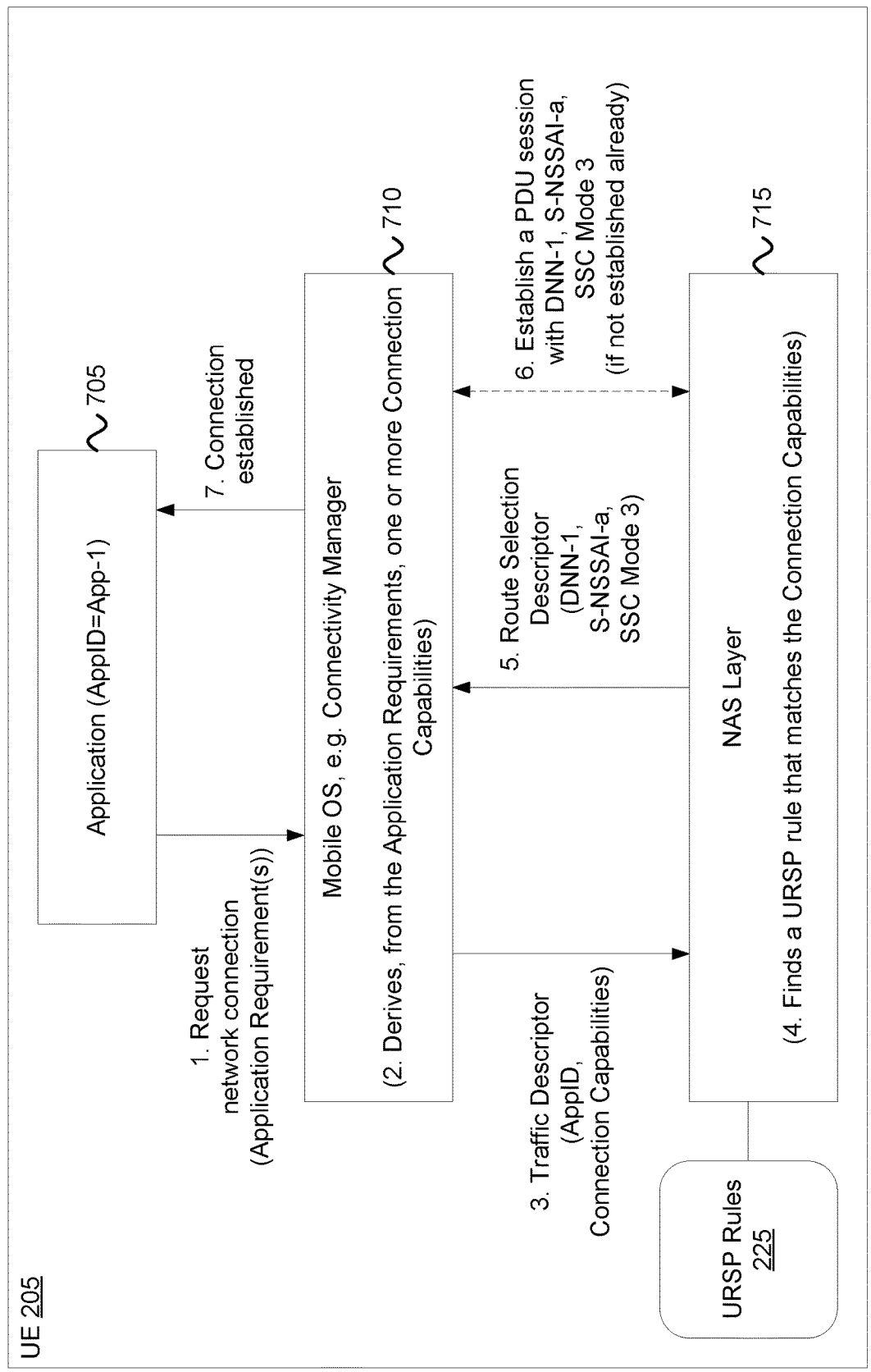
FIG. 7B is a block diagram illustrating another embodiment of a UE for mapping an OS-specific application requirement to an OS-independent connection capability.

FIGS. 7A and 7B depict alternative implementations of a UE 205 for the mapping of Application Requirements to the Connection Capabilities could be carried out at the NAS layer 715, as shown in FIG. 7A, or at the Mobile OS 710 itself, as shown in FIG. 7B. In the depicted embodiments, the UE 205 includes an application 705 (e.g., having the Application Identity of "App-1"), the Mobile OS 710, the NAS layer 715, and a set of URSP rules 225.

FIG. 7A shows a first implementation 700 of the mapping of Application Requirements to the Connection Capabilities. Here, the application 705 sends a request for a network connection to the Mobile OS 710, said request including one or more OS-specific Application Requirements. In certain embodiments, the request is handles by a connectivity manager within the Mobile OS 710. The Mobile OS 710 sends a Traffic Descriptor to the NAS layer 715. Here, the Traffic Descriptor includes the Application Identity (e.g., "App-1") and the Application requirement(s).

The NAS layer 715 maps the Application Requirement(s) to one or more Connection Capabilities and finds a URSP rule 225 that matches these Connection Capabilities. The NAS layer 715 sends a Route Selection Descriptor from the matching URSP rule 225 (e.g., "DNN-1, S-NSSAI-a, SSC Mode 3") to the Mobile OS 710. The Mobile OS 710 determines whether a matching PDU session is already established and, if not, establishes a PDU session with parameters from the Router Selection Descriptor (e.g., "DNN-1, S-NSSAI-a, SSC Mode 3"). The Mobile OS 710 signals the application 705 in response to the requested connection being established.

FIG. 7B shows a second implementation 720 of the mapping of Application Requirements to the Connection Capabilities. Again, the application 705 sends a request for a network connection to the Mobile OS 710, said request including one or more OS-specific Application Requirements. In certain embodiments, the request is handled by a connectivity manager within the Mobile OS 710. In the second implementation 720, the Mobile OS 710 maps the Application Requirement(s) to one or more Connection Capabilities and sends a Traffic Descriptor to the NAS layer 715. Here, the Traffic Descriptor includes the Application Identity (e.g., "App-1") and the one or more Connection Capabilities.

The NAS layer 715 then finds a URSP rule 225 that matches these Connection Capabilities. The NAS layer 715 sends a Route Selection Descriptor from the matching URSP rule 225 (e.g., "DNN-1, S-NSSAI-a, SSC Mode 3") to the Mobile OS 710. The Mobile OS 710 determines whether a matching PDU session is already established and, if not, establishes a PDU session with parameters from the Router Selection Descriptor (e.g., "DNN-1, S-NSSAI-a, SSC Mode 3"). The Mobile OS 710 signals the application 705 in response to the requested connection being established.

Figure 8:
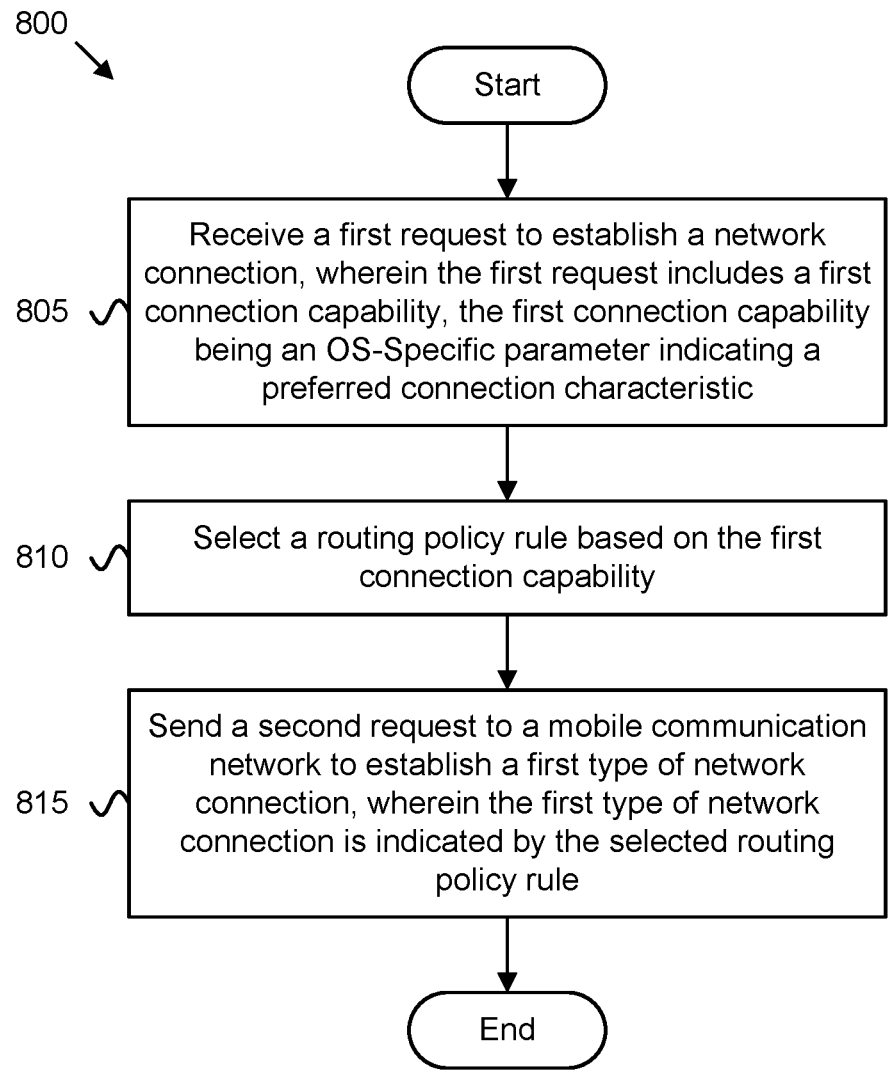
FIG. 8 is a flow chart diagram illustrating one embodiment of a first method for determining what type of network connection to establish from an OS-specific connection capability.

FIG. 8 depicts a method 800 for determining what type of network connection to establish from an OS-specific connection capability, according to embodiments of the disclosure. In some embodiments, the method 800 is performed by an apparatus, such as the remote unit 105, the UE 205, and/or the user equipment apparatus 300. In certain embodiments, the method 800 may be performed by a processor executing program code, for example, a microcontroller, a microprocessor, a CPU, a GPU, an auxiliary processing unit, a FPGA, or the like.

The method 800 begins and receives 805 a first request to establish a network connection. Here, the first request includes a first connection capability, the first connection capability being an OS-Specific parameter indicating a preferred connection characteristic. In various embodiments, the first request is received from an application running on the apparatus, such as the application 107 or the UE application 210. In such embodiments, the first connection capability may indicate one or more application requirements for the network connection.

The method 800 includes selecting 810 a routing policy rule based on the first connection capability. In various embodiments, the routing policy rule is a URSP selected from a URSP provisioned by the mobile communication network. The selected routing policy rule may indicate PDU Session parameters to be used to establish a PDU Session supporting the first connection capability.

In some embodiments, selecting 810 the routing policy rule includes identifying one or more second parameters corresponding to the first connection capability and searching a prioritized set of routing policy rules for a highest priority rule matching the one or more second parameters. In such embodiments, each second parameter is an OS-independent parameter corresponding to the first connection capability. Here, the prioritized set of routing policy rules includes a URSP provisioned by the mobile communication network. Moreover, a routing policy rule in the URSP includes one or more (OS-independent) second parameters (e.g., OS-independent connection capabilities).

The one or more second parameters may include one or more of: access to a specific data network, access to a specific service provided by the mobile communication network, connectivity via a specific network slice in the mobile communication network, connectivity via a specific type of access network, low-latency connection, and infrequent data connection. In one embodiment, identifying the one or more second parameters corresponding to the first connection capability is performed by an OS of the apparatus. In another embodiment, identifying the one or more second parameters corresponding to the first connection capability is performed by a NAS layer of the apparatus. Note that the NAS layer may be part of the 3GPP-compatible modem functionality of the apparatus.

In some embodiments, selecting 810 the routing policy rule includes selecting from a prioritized set of routing policy rules wherein a routing policy rule includes one or more OS-specific connection capabilities. The first connection capability indicates one or more of: access to a specific data network, access to a specific service provided by the mobile communication network, connectivity via a specific network slice in the mobile communication network, connectivity via a specific type of access network, low-latency connection, and infrequent data connection. In certain embodiments, the prioritized set of routing policy rules may be an OS-specific URSP. In certain embodiments, the prioritized set of routing policy rules includes a plurality of OS-specific application identities.

Prior to selecting 810 the routing policy rule, the apparatus may send an OS Identify parameter to the mobile communication network and receive the OS-specific URSP. In one embodiment, the apparatus sends the OS Identity parameter without having received an OS information request from the mobile communication network, e.g., sending the OS Identity parameter in a Registration Request message. In another embodiment, the apparatus sends the OS Identity parameter to the mobile communication network occurs in response to the mobile communication network requesting OS information.

The method 800 includes sending 815 a second request to a mobile communication network to establish a first type of network connection. Here, the first type of network connection is indicated by the selected routing policy rule. In various embodiments, sending 815 the second request to establish the first type of network connection includes sending a PDU Session Establishment request that contains the PDU Session parameters, wherein the first type of network connection is defined by the PDU Session parameters. The method 800 ends.

Figure 9:
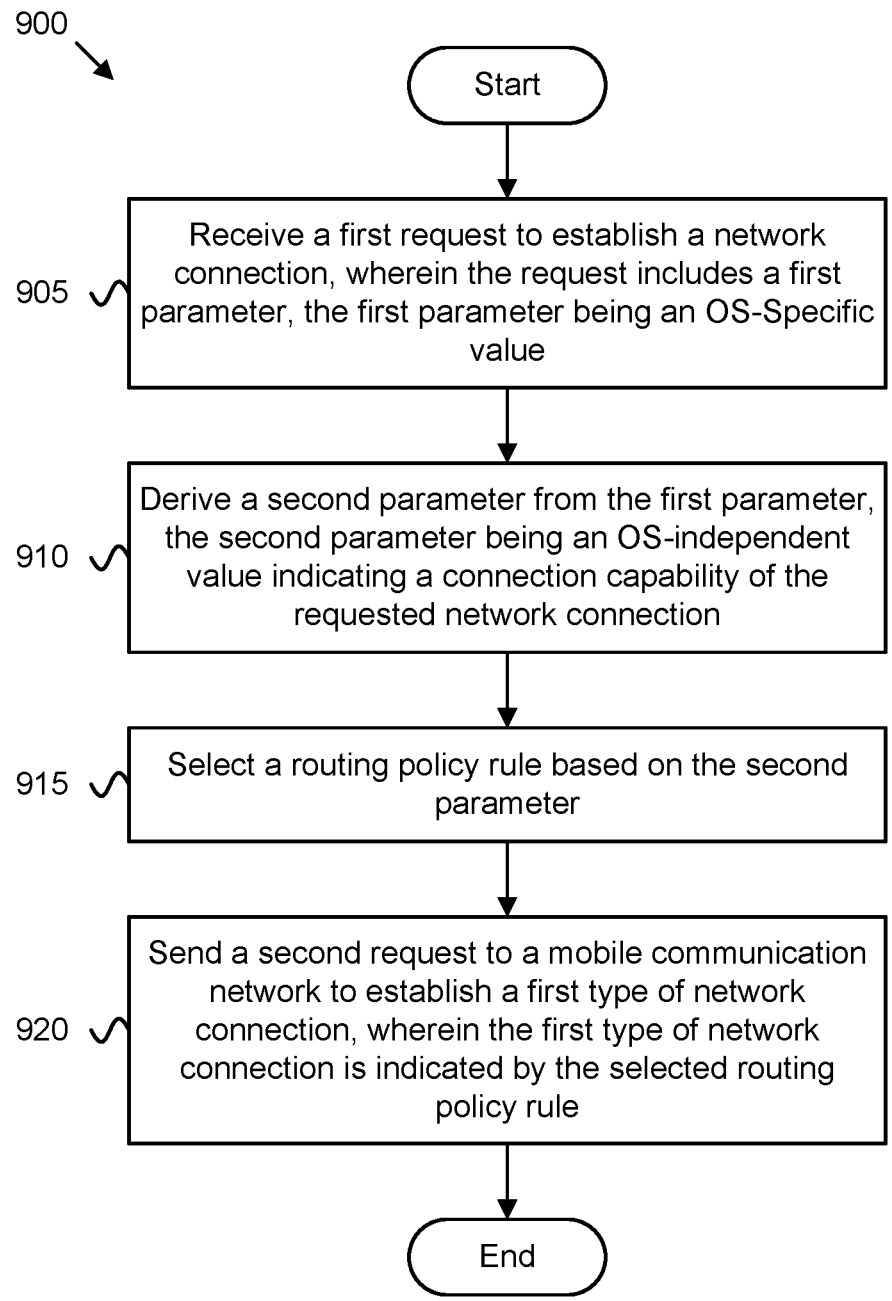
FIG. 9 is a flow chart diagram illustrating one embodiment of a second method for determining what type of network connection to establish from an OS-specific connection capability.

FIG. 9 depicts a method 900 for determining what type of network connection to establish from an OS-specific connection capability, according to embodiments of the disclosure. In some embodiments, the method 900 is performed by an apparatus, such as the remote unit 105, the UE 205, and/or the user equipment apparatus 300. In certain embodiments, the method 900 may be performed by a processor executing program code, for example, a microcontroller, a microprocessor, a CPU, a GPU, an auxiliary processing unit, a FPGA, or the like.

The method 900 begins and receives 905 a first request to establish a network connection. Here, the request includes a first parameter, the first parameter being an OS-specific value. In various embodiments, the first request is received from an application running on the apparatus, such as the application 107 or the UE application 210. In such embodiments, the first connection capability may indicate one or more application requirements for the network connection.

The method 900 includes deriving 910 a second parameter from the first parameter, the second parameter being an OS-independent value indicating a connection capability of the requested network connection. The one or more second parameters may include one or more of: access to a specific data network, access to a specific service provided by the mobile communication network, connectivity via a specific network slice in the mobile communication network, connectivity via a specific type of access network, low-latency connection, and infrequent data connection. In one embodiment, identifying the one or more second parameters corresponding to the first connection capability is performed by an OS of the apparatus. In another embodiment, identifying the one or more second parameters corresponding to the first connection capability is performed by a NAS layer of the apparatus. Note that the NAS layer may be part of the 3GPP-compatible modem functionality of the apparatus.

The method 900 includes selecting 915 a routing policy rule based on the first connection capability. In various embodiments, the routing policy rule is a URSP selected from an URSP provisioned by the mobile communication network. Moreover, a routing policy rule in the URSP includes one or more (OS-independent) second parameters (e.g., OS-independent connection capabilities).

In some embodiments, selecting 915 the routing policy rule includes searching a prioritized set of routing policy rules (e.g., URSP) for a highest priority rule matching the one or more second parameters. The selected routing policy rule may indicate PDU Session parameters to be used to establish a PDU Session supporting the first connection capability.

The method 900 includes sending 920 a second request to a mobile communication network to establish a first type of network connection. Here, the first type of network connection is indicated by the selected routing policy rule. In various embodiments, sending 920 the second request to establish the first type of network connection includes sending a PDU Session Establishment request that contains the PDU Session parameters, wherein the first type of network connection is defined by the PDU Session parameters. The method 900 ends.

Disclosed herein is a first method for determining what type of network connection to establish from an OS-specific connection capability. In various embodiments, the first method may be implemented by a user terminal, such as the remote unit 105, the UE 205, and/or the user equipment apparatus 300. The first method includes receiving (e.g., by the user terminal) a first request to establish a network connection, wherein the first request includes a first connection capability, the first connection capability being an OS specific parameter indicating a preferred connection characteristic. The first method includes selecting (e.g., by the user terminal) a routing policy rule based on the first connection capability. The first method includes sending (e.g., by the user terminal) a second request to a mobile communication network to establish a first type of network connection, wherein the first type of network connection is indicated by the selected routing policy rule.

In some embodiments of the first method, identifying one or more second parameters corresponding to the first connection capability, each second parameter being an OS-independent parameter corresponding to the first connection capability and searching a prioritized set of routing policy rules for a highest priority rule matching the one or more second parameters. In such embodiments, the prioritized set of routing policy rules may include a URSP, wherein the URSP is provisioned by the mobile communication network and wherein a routing policy rule in the URSP includes one or more OS-independent connection capabilities.

In certain embodiments, identifying the one or more second parameters corresponding to the first connection capability includes mapping the first connection capability to an OS-independent parameter selected from a predetermined set of parameters. In certain embodiments, identifying the one or more second parameters corresponding to the first connection capability is performed by an operating system of the user terminal. In certain embodiments, identifying the one or more second parameters corresponding to the first connection capability is performed by a NAS layer entity of the user terminal.

In certain embodiments, the one or more second parameters indicate one or more of: access to a specific data network, access to a specific service provided by the mobile communication network, connectivity via a specific network slice in the mobile communication network, low-latency connection, and infrequent data connection. In further embodiments, each second parameter may indicate a type of access network to be used to establish the network connection.

In some embodiments, the first method further comprises sending an OS Identity parameter to the mobile communication network and receiving a prioritized set of routing policy rules wherein a routing policy rule includes one or more OS-specific connection capabilities. In certain embodiments, the OS Identity parameter is sent in a Registration Request message, without a request from the mobile communication network. In other embodiments, sending the OS Identity parameter to the mobile communication network occurs in response to the mobile communication network requesting OS information.

In certain embodiments, the prioritized set of routing policy rules may include an OS-specific UE Route Selection Policy ("URSP"). In certain embodiments, the prioritized set of to routing policy rules may include a plurality of OS-specific application identities. In certain embodiments, the first connection capability is included in the plurality of OS-specific connection capabilities found in the routing policy rules. In certain embodiments, the first connection capability indicates one or more of: access to a specific data network, access to a specific service provided by the mobile communication network, connectivity via a specific network slice in the mobile communication network, connectivity via a specific type of access network, low-latency connection, and infrequent data connection.

In some embodiments of the first method, the first request is received from an application (e.g., running on the user terminal), wherein the first connection capability indicates one or more application requirements for the network connection. In some embodiments of the first method, the selected routing policy rule indicates PDU Session parameters to be used to establish a PDU Session supporting the first connection capability, wherein sending the second request to establish the first type of network connection includes sending a PDU Session Establishment request that contains the PDU Session parameters, wherein the first type of network connection is defined by the PDU Session parameters.

Disclosed herein is a first apparatus for determining what type of network connection to establish from an OS-specific connection capability. In various embodiments, the first method may be a user terminal, such as the remote unit 105, the UE 205, and/or the user equipment apparatus 300. The first apparatus includes a processor and a transceiver that communicates with a mobile communication network over one or more access networks. The processor receives a first request to establish a network connection, wherein the first request includes a first connection capability. Here, the connection capability is an OS specific parameter indicating a preferred connection characteristic. The processor selects a routing policy rule based on the first connection capability and sends (e.g., via the transceiver) a second request to a mobile communication network to establish a first type of network connection. Here, the first type of network connection is indicated by the selected routing policy rule.

In some embodiments, selecting the routing policy rule includes the processor identifying one or more second parameters corresponding to the first connection capability and searching a prioritized set of routing policy rules for a highest priority rule matching the one or more second parameters. Here, each second parameter may be an OS-independent parameter corresponding to the first connection capability. In such embodiments, the prioritized set of routing policy rules includes a URSP, wherein the URSP is provisioned by the mobile communication network and wherein a routing policy rule in the URSP includes one or more OS-independent connection capabilities.

In certain embodiments, identifying the one or more second parameters corresponding to the first connection capability includes the processor mapping the first connection capability to an OS-independent parameter selected from a predetermined set of parameters. In certain embodiments, the one or more second parameters include one or more of: access to a specific data network, access to a specific service provided by the mobile communication network, connectivity via a specific network slice in the mobile communication network, low-latency connection, and infrequent data connection. In further embodiments, each second parameter indicates a type of access network to be used to establish the network connection.

In some embodiments of the first apparatus, the processor sends, via the transceiver, an OS Identity parameter to the mobile communication network and receives a prioritized set of routing policy rules. In such embodiments, a routing policy rule includes one or more OS-specific connection capabilities. In certain embodiments, the OS Identity parameter is sent in a Registration Request message, without a request from the mobile communication network. In other embodiments, sending the OS Identity parameter to the mobile communication network occurs in response to the mobile communication network requesting OS information.

In certain embodiments, the prioritized set of routing policy may include an OS-specific URSP. In certain embodiments, the prioritized set of routing policy rules may include a plurality of OS-specific application identities. In certain embodiments, the first connection capability indicates one or more of: access to a specific data network, access to a specific service provided by the mobile communication network, connectivity via a specific network slice in the mobile communication network, connectivity via a specific type of access network, low-latency connection, and infrequent data connection.

In some embodiments of the first apparatus, the first request is received from an application running on the apparatus, wherein the first connection capability indicates one or more application requirements for the network connection. In some embodiments of the first apparatus, the selected routing policy rule indicates PDU Session parameters to be used to establish a PDU Session supporting the first connection capability, wherein sending the second request to establish the first type of network connection includes sending a PDU Session Establishment request that contains the PDU Session parameters, wherein the first type of network connection is defined by the PDU Session parameters.

Disclosed herein is a second method for determining what type of network connection to establish from an OS-specific connection capability. In various embodiments, the second method may be implemented by a user terminal, such as the remote unit 105, the UE 205, and/or the user equipment apparatus 300. The second method includes receiving (e.g., by the user terminal) a first request to establish a network connection, wherein the request includes a first parameter, the first parameter being an OS specific value. The second method includes deriving a second parameter from the first parameter, the second parameter being an OS-independent value indicating a connection capability of the requested network connection. The second method includes selecting (e.g., by the user terminal) a routing policy rule based on the second parameter. The second method also includes sending (e.g., by the user terminal) second request to a mobile communication network to establish a first type of network connection, wherein the first type of network connection is indicated by the selected routing policy rule.

In some embodiments of the second method, the routing policy rule is selected from a URSP, wherein the URSP is provisioned by the mobile communication network, and wherein a routing policy rule in the URSP includes one or more OS-independent connection capabilities. In some embodiments of the second method, the second parameter includes one or more of: access to a specific data network, access to a specific service provided by the mobile communication network, connectivity via a specific network slice in the mobile communication network, connectivity via a specific type of access network, low-latency connection, and infrequent data connection.

In some embodiments of the second method, the first request is received from an application (e.g., running on the user terminal), wherein the first parameter indicates one or more application requirements for the network connection. In certain embodiments of the second method, deriving the second parameter from the first parameter includes mapping an OS-specific application requirement to an OS-independent connection capability selected from a predetermined set of connection capabilities.

In some embodiments of the second method, the selected routing policy rule indicates PDU Session parameters to be used to establish a PDU Session supporting the first parameter, wherein sending the second request to establish the first type of network connection includes sending a PDU Session Establishment request that contains the PDU Session parameters, wherein the first type of network connection is defined by the PDU Session parameters.

Disclosed herein is a second apparatus for determining what type of network connection to establish from an OS-specific connection capability. In various embodiments, the second method may be a user terminal, such as the remote unit 105, the UE 205, and/or the user equipment apparatus 300. The second apparatus includes a processor and a transceiver that communicates with a mobile communication network over one or more access networks. The processor receives a first request to establish a network connection. Here, the request includes a first parameter, the first parameter being an OS specific value. The processor derives a second parameter from the first parameter, the second parameter being an OS-independent value indicating a connection capability of the requested network connection. The processor selects a routing policy rule based on the second parameter. The processor sends a second request to a mobile communication network to establish a first type of network connection. Here, the first type of network connection is indicated by the selected routing policy rule.

In some embodiments of the second apparatus, the routing policy rule is selected from a URSP, wherein the URSP is provisioned by the mobile communication network, and wherein a routing policy rule in the URSP includes one or more OS-independent connection capabilities. In some embodiments of the second apparatus, the second parameter includes one or more of: access to a specific data network, access to a specific service provided by the mobile communication network, connectivity via a specific network slice in the mobile communication network, connectivity via a specific type of access network, low-latency connection, and infrequent data connection.

In some embodiments of the second apparatus, the first request is received from an application running on the apparatus, wherein the first parameter indicates one or more application requirements for the network connection. In some embodiments of the second apparatus, deriving the second parameter from the first parameter includes mapping an OS-specific application requirement to an OS-independent connection capability selected from a predetermined set of connection capabilities.

In some embodiments of the second apparatus, the selected routing policy rule indicates PDU Session parameters to be used to establish a PDU Session supporting the first parameter, wherein sending the second request to establish the first type of network connection includes sending a PDU Session Establishment request that contains the PDU Session parameters, wherein the first type of network connection is defined by the PDU Session parameters.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a User Equipment ("UE"), the method comprising:
   receiving, from a mobile communication network, a UE Route Selection Policy ("URSP") comprising a plurality of operating system ("OS")-independent connection capabilities, wherein each routing policy rule of the URSP comprises a traffic descriptor component, and wherein each routing policy rule of the URSP comprises a respective OS-independent connection capability within the traffic descriptor component;
   receiving a first request to establish a network connection, wherein the first request includes a first set of connection capabilities, each connection capability in the first set having an OS specific value that indicates an application requirement for the requested network connection, the OS specific value being selected from the group comprising: a service type, a transport network type, and a latency type;
   deriving a second set of connection capabilities from the first set of connection capabilities by mapping the first set of connection capabilities to a respective OS-independent connection capability of the plurality of OS-independent connection capabilities, each connection capability in the second set having an OS-independent value that indicates an application requirement for the requested network connection; and
   selecting a respective routing policy rule based on the second set of connection capabilities; and
   sending a second request to the mobile communication network to establish a first type of network connection, wherein the first type of network connection is indicated by the respective routing policy rule.

2. The method of claim 1, wherein selecting the respective routing policy rule comprises searching a prioritized set of routing policy rules for a highest priority rule matching the second set of connection capabilities.

3. The method of claim 2, wherein the prioritized set of routing policy rules comprises the URSP provisioned by the mobile communication network.

4. The method of claim 1, wherein the second set of connection capabilities indicate one or more of: access to a specific data network, access to a specific service provided by the mobile communication network, connectivity via a specific network slice in the mobile communication network, connectivity via a specific type of access network, low-latency connection, and infrequent data connection.

5. The method of claim 1, further comprising:
sending an OS Identity parameter to the mobile communication network; and
receiving a prioritized set of routing policy rules, wherein at least one rule in the prioritized set of routing policy rules includes one or more OS-specific connection capabilities.

6. The method of claim 5, wherein the OS Identity parameter is sent in a Registration Request message, without a request from the mobile communication network.

7. The method of claim 5, wherein sending the OS Identity parameter to the mobile communication network occurs in response to the mobile communication network requesting OS information.

8. The method of claim 5, wherein the prioritized set of routing policy rules comprises an OS-specific URSP.

9. The method of claim 5, wherein the prioritized set of routing policy rules comprises a plurality of OS-specific application identities.

10. The method of claim 5, wherein the first set of connection capabilities indicates one or more of: access to a specific data network, access to a specific service provided by the mobile communication network, connectivity via a specific network slice in the mobile communication network, connectivity via a specific type of access network, low-latency connection, and infrequent data connection.

11. The method of claim 1, wherein the first request is received from an application, and wherein the first set of connection capabilities indicates one or more requirements of the application for the network connection.

12. The method of claim 1, wherein the respective routing policy rule indicates Protocol Data Unit ("PDU") Session parameters to be used to establish a PDU Session supporting the first set of connection capabilities, wherein sending the second request to establish the first type of network connection includes sending a PDU Session Establishment request that contains the PDU Session parameters, and wherein the first type of network connection is defined by the PDU Session parameters.

13. The method of claim 1, wherein the OS-independent value is a connection capability identifier.

14. The method of claim 1, wherein the service type indicates a service that is to be accessible via the network connection, wherein the transport network type indicates a type of network that the network connection is to use, and wherein the latency type indicates a level latency and reliability that is to be supported by the network connection.

15. A method performed by a user equipment ("UE"), the method comprising:
receiving, from a mobile communication network, a UE Route Selection Policy ("URSP") comprising a plurality of operating system ("OS")-independent connection capabilities, wherein each routing policy rule of the URSP comprises a traffic descriptor component, and wherein each routing policy rule of the URSP comprises a respective OS-independent connection capability within the traffic descriptor component;
receiving a first request to establish a network connection, wherein the request includes a first set of connection capabilities, each connection capability in the first set having an OS specific value that indicates an application requirement for the requested network connection using a value specific to an OS of the UE, wherein the OS specific value is selected from the group comprising: a service type, a transport network type, and a latency type;
deriving a second set of connection capabilities from the first set of connection capabilities by mapping the first set of connection capabilities to a respective OS-independent connection capability of the plurality of OS-independent connection capabilities, each connection capability in the second set having an OS-independent value that indicates an application requirement for the requested network connection;
selecting a respective routing policy rule from the URSP based on the second set of connection capabilities; and
sending a second request to the mobile communication network to establish a first type of network connection, wherein the first type of network connection is indicated by the respective routing policy rule.

16. The method of claim 15, wherein selecting the respective routing policy rule comprises searching a prioritized set of routing policy rules for a highest priority rule matching the second set of connection capabilities.

17. The method of claim 15, wherein the second set of connection capabilities comprises one or more of: access to a specific data network, access to a specific service provided by the mobile communication network, connectivity via a specific network slice in the mobile communication network, connectivity via a specific type of access network, low-latency connection, and infrequent data connection.

18. The method of claim 15, wherein the first request is received from an application, wherein the first set of connection capabilities indicates one or more requirements of the application for the network connection.

19. The method of claim 14, wherein the respective routing policy rule indicates Protocol Data Unit ("PDU") Session parameters to be used to establish a PDU Session supporting the first set of connection capabilities, wherein sending the second request to establish the first type of network connection includes sending a PDU Session Establishment request that contains the PDU Session parameters, and wherein the first type of network connection is defined by the PDU Session parameters.

20. A user equipment ("UE") for wireless communication, comprising:
at least one memory; and
at least one processor coupled with the at least one memory and configured to cause the UE to:
receive, from the mobile communication network, a UE Route Selection Policy ("URSP") comprising a plurality of operating system ("OS")-independent connection capabilities, wherein each routing policy rule of the URSP comprises a traffic descriptor component, wherein each routing policy rule of the URSP comprises a respective OS-independent connection capability within the traffic descriptor component;
receive a first request to establish a network connection, wherein the first request comprises a first set of connection capabilities, each connection capability in the first set having an OS specific value that indicates an application requirement for the requested network connection, the OS specific value being selected from the group comprising: a service type, a transport network type, and a latency type;
derive a second set of connection capabilities from the first set of connection capabilities by mapping the first set of connection capabilities to a respective OS-independent connection capability of the plurality of OS-independent connection capabilities, each connection capability in the second set having an OS-independent value that indicates an application requirement for the requested network connection;

select a respective routing policy rule based on the second set of connection capabilities; and send a second request to the mobile communication network to establish a first type of network connection, wherein the first type of network connection is indicated by the respective routing policy rule.

21. A user equipment ("UE") for wireless communication, comprising:

at least one memory; and at least one processor coupled with the at least one memory and configured to cause the UE to:

receive, from the mobile communication network, a UE Route Selection Policy ("URSP") comprising a plurality of operating system ("OS")-independent connection capabilities, wherein each routing policy rule of the URSP comprises a traffic descriptor component, wherein each routing policy rule of the URSP comprises a respective OS-independent connection capability within the traffic descriptor component;

receive a first request to establish a network connection, wherein the request comprises a first set of connection capabilities, each connection capability in the first set having an OS specific value that indicates an application requirement for the requested network connection using a value specific to an OS of the UE, wherein the OS specific value is selected from the group comprising: a service type, a transport network type, and a latency type;

derive a second set of connection capabilities from the first set of connection capabilities by mapping the first set of connection capabilities to a respective OS-independent connection capability of the plurality of OS-independent connection capabilities, each connection capability in the second set having an OS-independent value that indicates an application requirement for the requested network connection;

select a respective routing policy rule from the URSP based on the second set of connection capabilities; and send a second request to the mobile communication network to establish a first type of network connection, wherein the first type of network connection is indicated by the respective routing policy rule.

\* \* \* \* \*